United States Patent
Braun et al.

(10) Patent No.: US 11,821,663 B2
(45) Date of Patent: Nov. 21, 2023

(54) IN-SITU OIL CIRCULATION RATIO MEASUREMENT SYSTEM FOR VAPOR COMPRESSION CYCLE SYSTEMS

(71) Applicant: Purdue Research Foundation, West Lafayette, IN (US)

(72) Inventors: James Edward Braun, West Lafayette, IN (US); Eckhard Achim Groll, West Lafayette, IN (US); William Travis Horton, West Lafayette, IN (US); Orkan Kurtulus, West Lafayette, IN (US); Vatsal Shah, West Lafayette, IN (US)

(73) Assignee: Purdue Research Foundation

( * ) Notice: Subject to any disclaimer, the term of this patent is extended or adjusted under 35 U.S.C. 154(b) by 28 days.

(21) Appl. No.: 17/383,177

(22) Filed: Jul. 22, 2021

(65) Prior Publication Data

US 2022/0026121 A1    Jan. 27, 2022

Related U.S. Application Data

(60) Provisional application No. 63/055,106, filed on Jul. 22, 2020.

(51) Int. Cl.
*F25B 3/00*     (2006.01)
*G01K 3/00*     (2006.01)
(Continued)

(52) U.S. Cl.
CPC ........ *F25B 31/004* (2013.01); *G01F 23/0007* (2013.01); *G01K 3/005* (2013.01)

(58) Field of Classification Search
CPC ...... F25B 31/004; F25B 31/002; F25B 43/02; F25B 2400/23; F25B 2500/16; F25B 2700/03; G01F 23/0007; G01K 3/005
See application file for complete search history.

(56) References Cited

U.S. PATENT DOCUMENTS 5,052,897 A    10/1991    Yamashita et al.
6,776,029 B2    8/2004    Hotta et al.
(Continued)

FOREIGN PATENT DOCUMENTS

CN    103939324 A    7/2014

OTHER PUBLICATIONS

Gao, L. et al., Measurement of oil circulation ratio in CO2 Heat Pump Systems, 2011, 10th IEA Heat Pump Conference.
(Continued)

*Primary Examiner* — Henry T Crenshaw
*Assistant Examiner* — Kamran Tavakoldavani
(74) *Attorney, Agent, or Firm* — Purdue Research Foundation

(57) ABSTRACT

A system for measuring oil circulation ratio in a vapor-compression refrigeration system (VCRS) is provided. The system may include an oil separator configured to receive the refrigerant and oil flow from the low-pressure line of the VCRS and output a oil flow and a refrigerant flow. The system may further include an oil collector configured to receive the separated oil flow provided by the oil separator. A valve may control an oil flow from the oil collector to the low-pressure line. A level sensor may measure oil level in the oil collector. The system may close, in response to the oil being at or less than a first level, the valve to collect oil in the oil collector. The system may open, in response to the oil being at or greater than a second level, the valve to release oil from the oil collector to the low-pressure line.

17 Claims, 9 Drawing Sheets

(51) Int. Cl.
*G01F 23/00* (2022.01)
*F25B 31/00* (2006.01)

(56) References Cited

U.S. PATENT DOCUMENTS

| | | | |
|---|---|---|---|
| 7,895,846 B2 | 3/2011 | He et al. | |
| 10,550,885 B2 | 2/2020 | Yang et al. | |
| 10,556,140 B2 | 2/2020 | Hulse et al. | |
| 10,557,103 B2 | 2/2020 | Kaneko et al. | |
| 10,563,107 B2 | 2/2020 | Nappa et al. | |
| 10,570,323 B2 | 2/2020 | Ota et al. | |
| 10,584,744 B2 | 3/2020 | Kozuma et al. | |
| 10,598,413 B2 | 3/2020 | Ote | |
| 10,604,689 B2 | 3/2020 | Fukushima | |
| 10,605,492 B2 | 3/2020 | Ozu et al. | |
| 10,627,138 B2 | 4/2020 | Mizutani | |
| 10,630,130 B2 | 4/2020 | Suzuki et al. | |
| 10,641,529 B2 | 5/2020 | Opalka et al. | |
| 10,655,897 B2 | 5/2020 | Goel et al. | |
| 10,684,046 B2 | 6/2020 | Ishiyama et al. | |
| 10,684,055 B2 | 6/2020 | Goel et al. | |
| 2009/0071187 A1* | 3/2009 | Sakitani | F25B 13/00 62/468 |
| 2019/0242622 A1* | 8/2019 | Matsuda | F25B 43/02 |
| 2020/0292216 A1* | 9/2020 | Tanawittayakorn | F25B 31/004 |

OTHER PUBLICATIONS

Min, K. et al., Oil circulation rate in rotary compressor: its measurement and factors affecting the rate, 2000, 15th International Compressor Engineering Conference.

Ashrae, 2015. Standard 41.4: Method for measurement of proportion of lubricant in liquid refrigerant, American Society for Heating, in: Refrigeration, and Air-Conditioning Engineers.

* cited by examiner

IN-SITU OIL CIRCULATION RATIO MEASUREMENT SYSTEM FOR VAPOR COMPRESSION CYCLE SYSTEMS

CROSS-REFERENCE TO RELATED APPLICATIONS

This application claims the benefit of U.S. Provisional Application No. 63/055,106 filed Jul. 22, 2020, the entirety which is incorporate by reference.

TECHNICAL FIELD

This disclosure relates to vapor-compression refrigeration systems and, in particular, to oil circulation management of vapor-compression refrigeration systems.

BACKGROUND

Oil circulation ratio (OCR) is a measure of the fraction of oil flowing within the working fluid of a system. Present approaches to OCR measurement in vapor-compression refrigeration system (VCRS) involve measuring the oil concentration in the liquid line where the refrigerant and oil are assumed to be homogeneous. However, a slip ratio between the refrigerant vapor and liquid oil may cause inaccuracies in OCR measurement.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
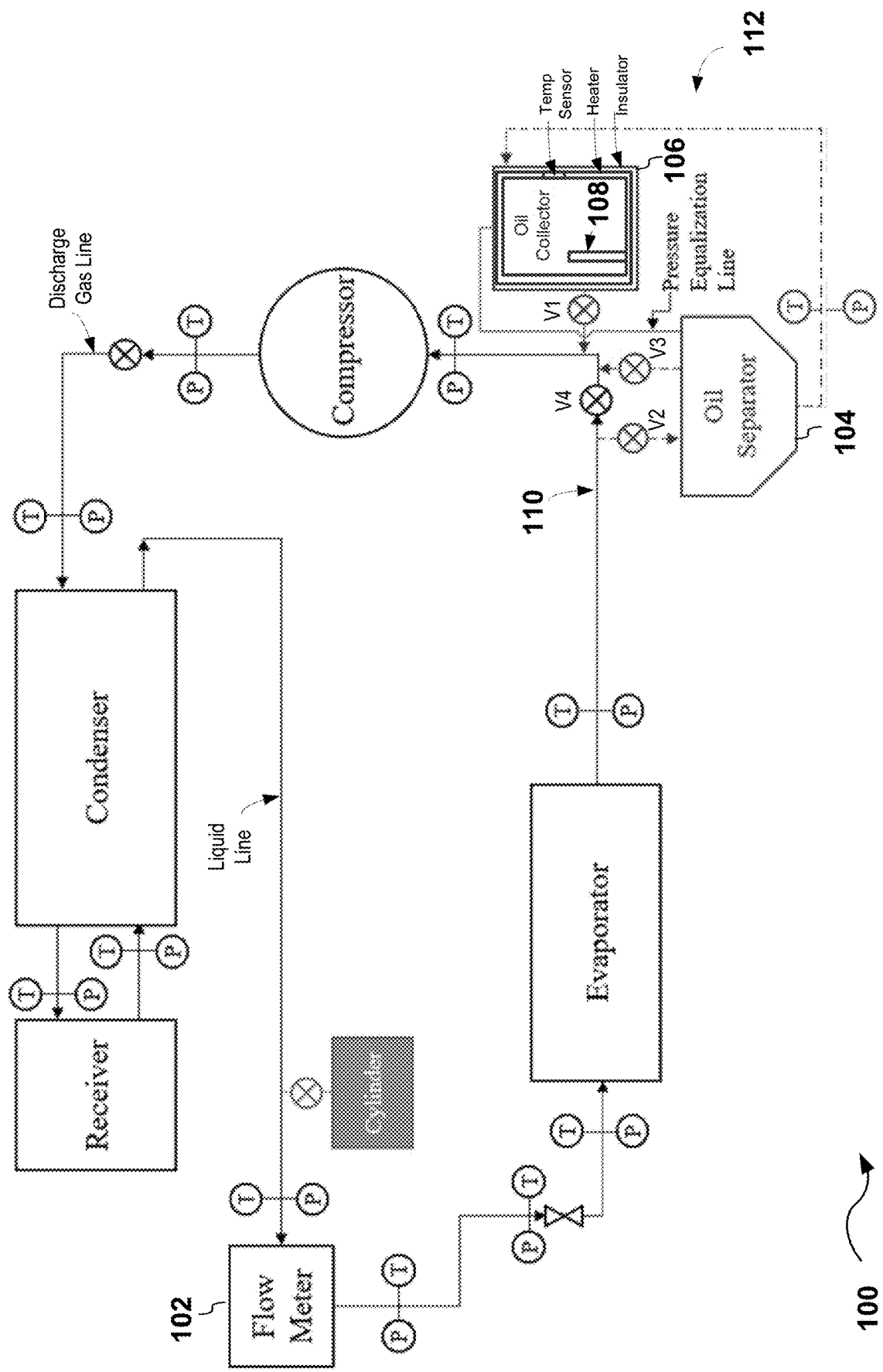
FIG. 1 illustrates a first example of a system.

The growing applications of variable-speed and tandem compressors, coupled with emerging refrigerant-oil combinations, can lead to higher levels of oil retention in vapor compression systems especially at lower refrigerant mass flow rates. To develop better designs and mitigation strategies, it is important to have methods for accurately measuring oil circulation ratio (OCR). High levels of OCR reduce the efficiency of heat exchangers (evaporators and condensers) and reduce the oil level in the compressor, which may ultimately affect its efficiency and life span. However, measuring OCR within a vapor compression cycle is challenging due to various factors, such as the phase change of the working fluid at different locations, miscibility between the oil and refrigerant, and varying flow regimes.

Existing approaches measure the oil concentration in the liquid line where the refrigerant and oil are assumed to be homogeneous, which is a good assumption if they are miscible. If they are homogeneous and uniform, then measuring oil concentration in the refrigerant is the same as measuring the oil concentration ratio. However, this is not true in the gas line as there is a slip ratio between the refrigerant vapor and liquid oil. Oil concentration may drastically differ from OCR in a system with immiscible oil ($CO_2$ and PAG). Therefore, if the refrigerant oil combination is not miscible or even partially miscible, the accuracy of these techniques to measure OCR is questionable. Likewise, the sampling methods may also be inaccurate if the refrigerant and lubricant sample that is collected from the liquid line is not homogeneous.

Accordingly, there is disclosed system and methods for OCR measurement in a VCRS. By way of introductory example, a system may include an oil separator configured to receive the refrigerant and oil flow from the low-pressure line of the VCRS and output an oil flow and a refrigerant flow. The system may further include an oil collector configured to receive the separated oil flow provided by the oil separator. A valve may control an oil flow from the oil collector to the low-pressure line. A level sensor may measure oil level in the oil collector. The system may close, in response to the oil being at or less than a first level, the valve to collect oil in the oil collector. The system may open, in response to the oil being at or greater than a second level, the valve to release oil from the oil collector to the low-pressure line.

An example of a technical advancement of the system and methods described herein is a non-invasive, in-situ method to measure OCR in real time, which involves minimal human intervention. Instead of using the liquid line, the measurement is implemented on the suction line where the oil is separated from the vapor refrigerant using an oil separator and the rate of oil separation is measured. This method fundamentally eliminates the issue of immiscibility, while still giving the advantage of a real-time measurement. In addition, if the oil separator is sized correctly for the application, there is no need of calibration for different combinations of oil and refrigerant. The only calibration that is required is the oil level sensor which is fairly simple. Additional benefits, efficiencies, and improvements are made evident in the systems and methods described below.

FIG. 1 illustrates a first example of a system 100. The system 100 may a mass flow meter 102, an oil separator 104, an oil collector 106, an oil level sensor 108, and valves (labeled V1-V4 in FIG. 1). The mass flow meter 102, oil separator 104, oil collector 106, and valves V1-V4 may be connected in an oil measurement loop 112 (hereinafter referred to as "the loop") on a suction line 110 of a vapor-compression refrigeration system (VCRS).

The suction line 110 of a VCRS refers to a line on the low-pressure side of the VCRS where oil and refrigerant, and other fluid(s), flow to a compressor. The terms "suction line" and "low-pressure line" may be used interchangeably.

The loop 112 may have inlets and outlets that connect to suction line. In some examples, the loop may connect to the suction line downstream of an evaporator and upstream of the compressor.

The loop 112 may be engaged by opening the valves V2 and V3. That is to say V2 and V3 may fluidically couple the oil separator 104 to the suction line 110. In some examples, V4 may separate valves V2 and V3 thus creating a pressure difference that causes oil and refrigerant in the low-pressure line 110 to by-passed through the oil measurement loop 112.

The oil separator 104 may separate the oil from the refrigerant/oil flow coming from the low-pressure line 110. Refrigerant separated by the oil separator 104 may flow back to the low-pressure line 110 via refrigerant drain line controlled by V3. The oil separated by the oil separator 104 may flow into the oil collector 106.

The oil collector may 106 include a tank to collect the oil. The oil collector 106 may receive oil separated by the oil separator 104. The oil collector 106 may include an oil level sensor 108. The oil level sensor 108 may measure the level of oil in the oil collector 106. The oil level sensor 108 may include, for example, a liquid level probe at least partially disposed in the oil collector. It should be appreciated that the oil level sensor may provide the oil level (volume) of the oil in the tank. Alternatively, the oil level sensor 108 may be calibrated to provide the mass of the oil in the tank. In other examples, the oil level sensor 108 may include one or more switch that located a predetermined location (such as height) in a tank of predetermined volume. Accordingly, volume of the oil in the tank may be measured based location of the switch in response to the switch being toggled.

The valve V1 may control oil flow from the oil collector 106 back to the low-pressure line 110. V1 may be connected to an oil discharge line that couples the oil collector with the suction line. Opening V1 causes oil in the oil collector to be released into suction line/compressor. Closing V1 causes oil to be collected in the oil-collector.

V1 may be controlled based on oil level in the oil collector 106. When the oil level in the collector increased more than the upper set point value, V1 may automatically open to drain the oil back into the compressor through the suction line 110. When the level in the oil collector 106 reached the lower set point, V1 may automatically close to start collecting the oil again. The upper and lower set point values are user selectable.

In some examples, a pressure equalization line may connect the oil collector with the oil separator and/or low-pressure line to cause the oil collector to receive oil flow even when the valve V1 is closed.

In some examples, a temperature-controlled heater, such as a heat tape, may be wrapped at least partially around the oil collector 106 and then the oil collector 106 and heat tape may be insulated. A temperature sensor may be installed on the suction line 110. The surface temperature of the oil collector 106 may be maintained higher approximately 5-20 K above the saturation temperature of the suction line 110 to prevent any refrigerant from condensing in the oil collector 106. Temperature control of the vessel may improve the quality of the oil level measurement and repeatability of the measurement system.

Saturation temperature ($T_{sat}$) is the temperature at which a pure substance changes phase at a given pressure. $T_{sat}$ is calculated based on the pressure reading from a pressure sensor. Using the pressure reading, $T_{sat}$ can be determined from refrigerant specific equation of state.

A controller controlling the heat tape may receive a temperature set point from the user which, in most cases, is approximately 5-20 K higher than the saturation temperature. The controller also receives the actual wall temperature of the oil collector from a temperature sensor. The controller then controls the capacity of the heat tape to maintain the actual temperature of the oil collector 106 at the set point temperature.

The mass flow sensor 102 may generate a mass flow measurement. The mass flow measurement may be the mass flow rate of oil and refrigerant in the liquid line. The mass flow measurement obtained from the flow meter may be used to calculate OCR, as shown in Equation 2 below.

Figure 2:
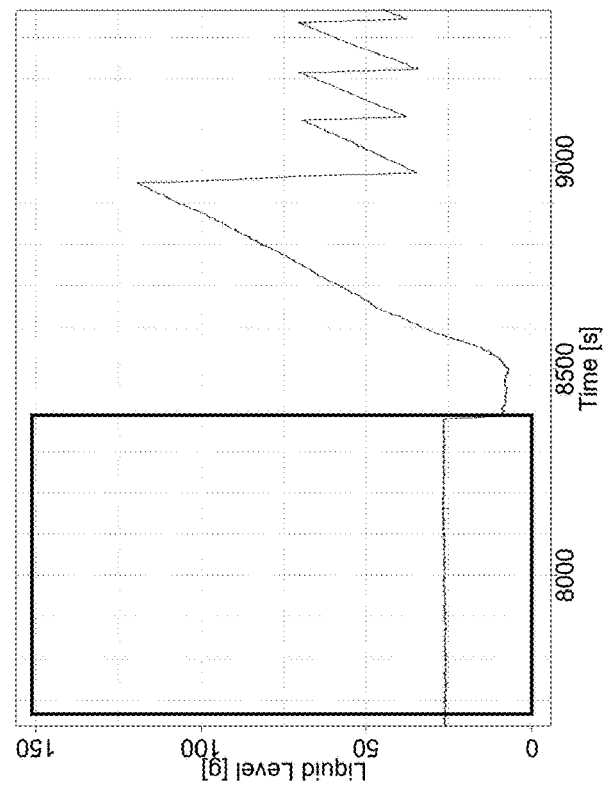
FIG. 2 illustrates an example of a system during initialization.
Figure 2:
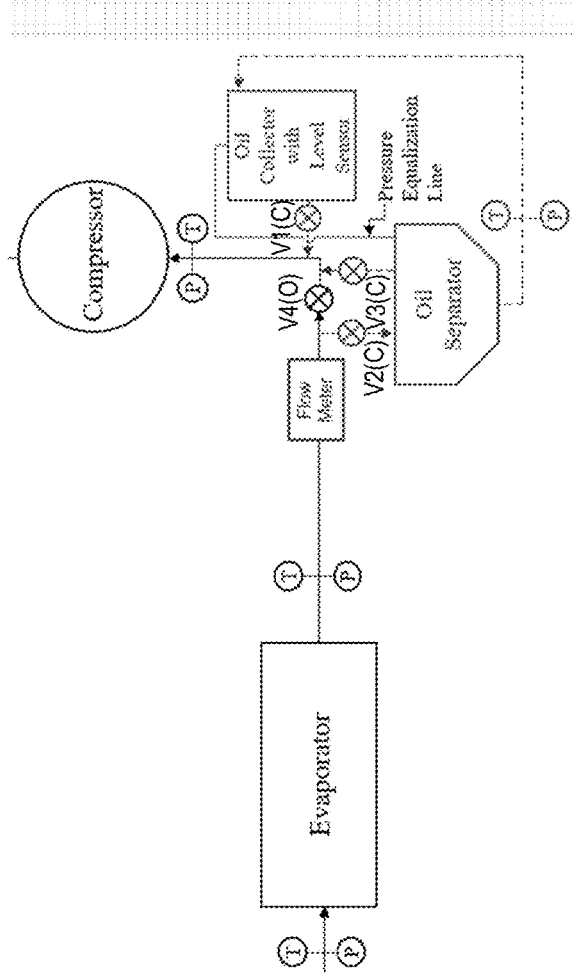

FIG. 2 illustrates an example of the system during initialization. Initialization may involve allowing the VCRS to reach a steady state operation. The system may keep the oil measurement loop closed off by closing valves V1, V2, and V3, and keeping V4 open. The system may determine the VCRS has reached steady state after some predetermined criteria is satisfied. For example, the system may determine the VCRS has reached steady state after the VCRS has been operation for a predetermined amount of time (i.e. 1 hour). A VCRS is operational when the compressor is engaged causing fluid to flow through the system.

Figure 3:
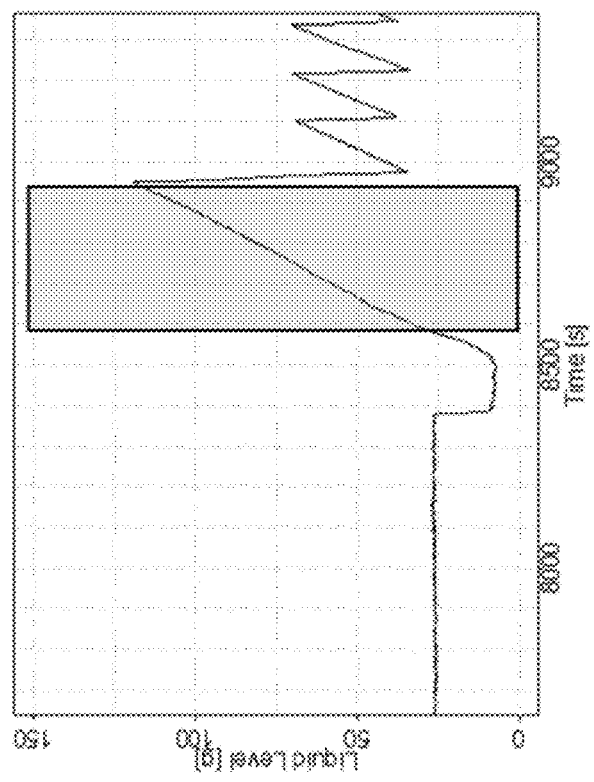
FIG. 3 illustrates an example of a system during operation after the VCRS reaches steady state.
Figure 3:
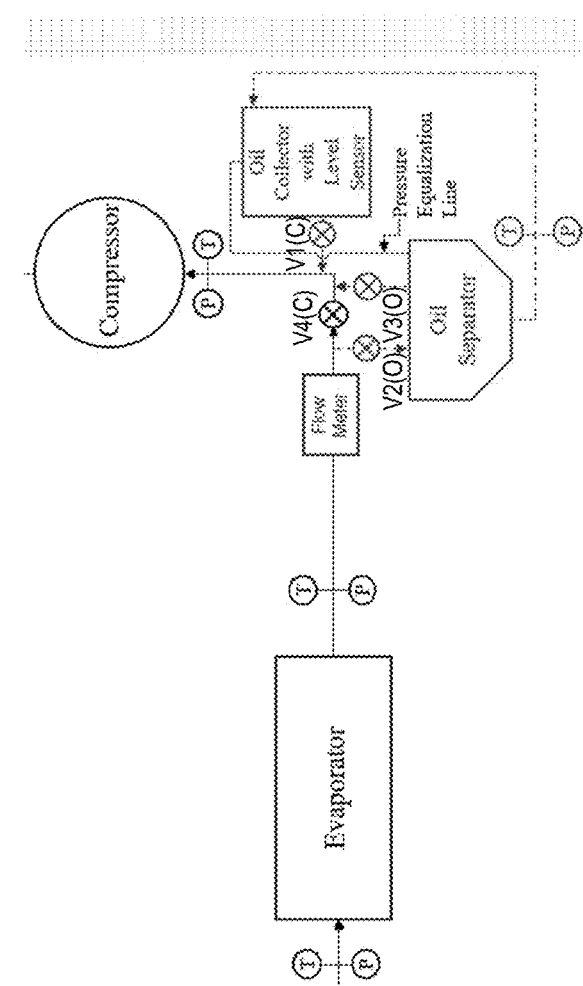

FIG. 3 illustrates an example of the system during operation after the VCRS reaches steady state. After the VCRS reaches steady state, the system may open V2 and V3, close V4, and close V1 (or keep V1 closed). The oil separator may cause oil to separate and flow into the oil collector.

Figure 4:
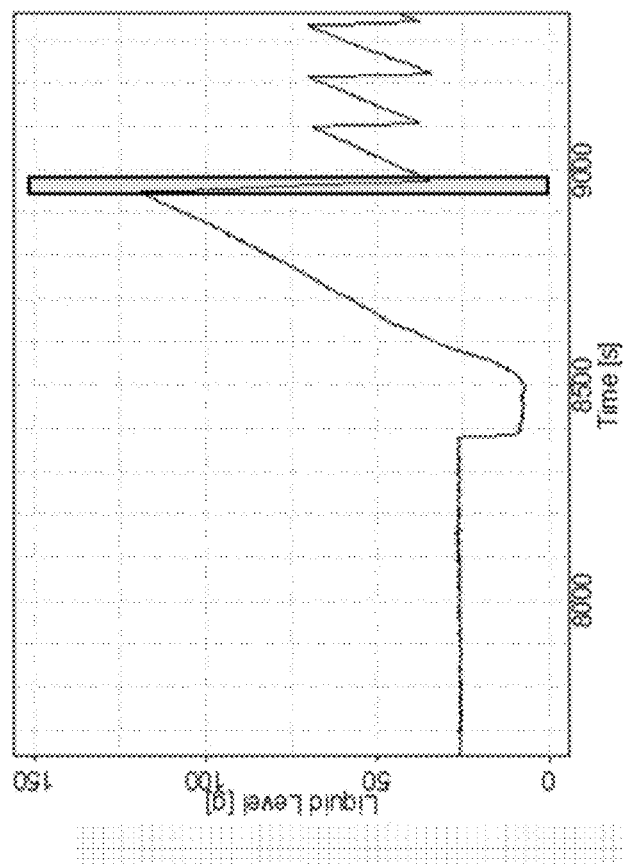
FIG. 4 illustrates an example of a system during operation when oil reaches an upper limit.
Figure 4:
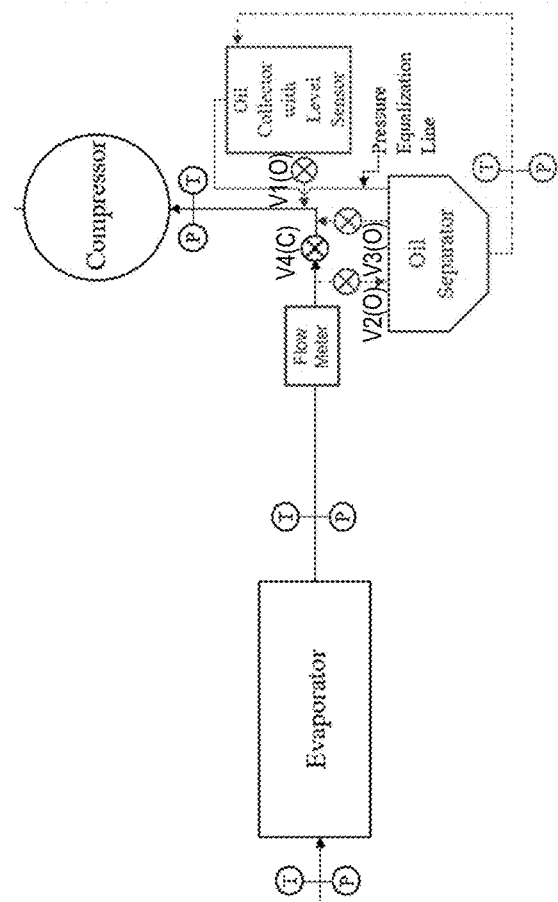

FIG. 4 illustrates an example of the system during operation when oil reaches an upper limit. Once oil reaches an upper limit, V1 may open, causing oil to be drained back into the suction line and/or the suction port of the compressor. Opening V1 may cause the oil level in the oil collector to drop.

Figure 5:
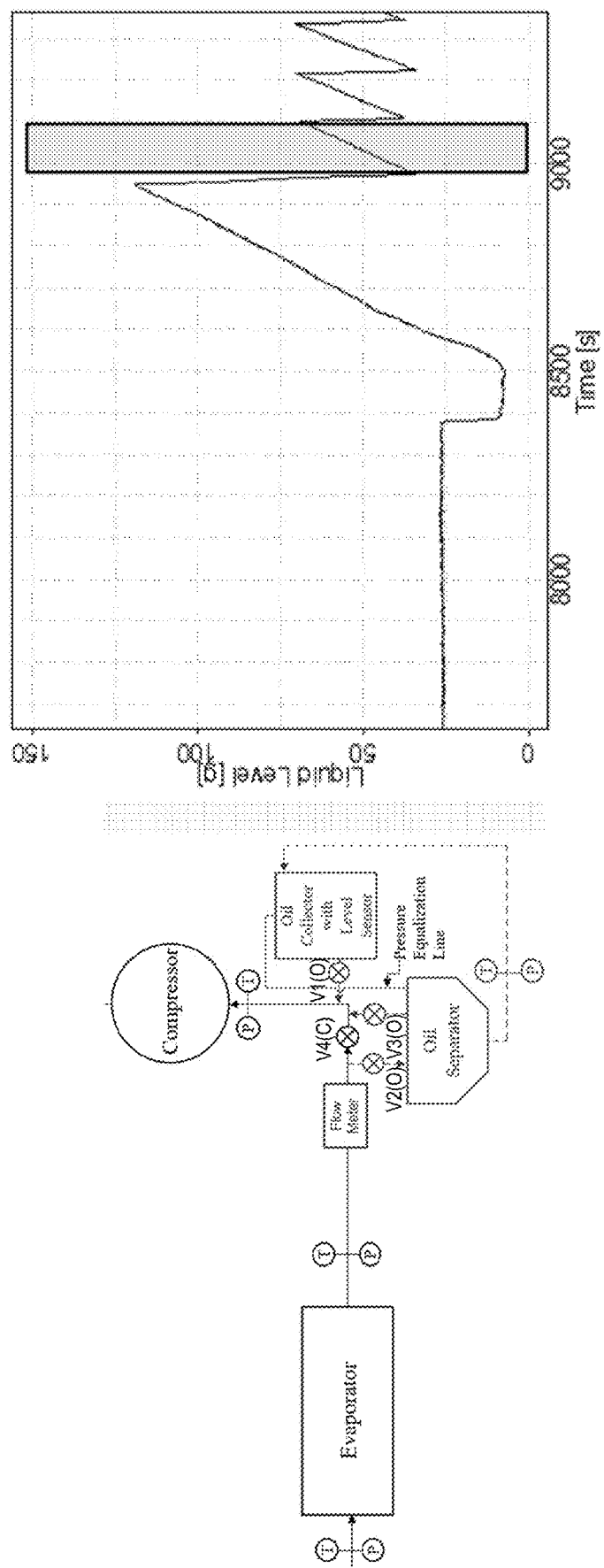
FIG. 5 illustrates an example of a system during operation when oil reaches a lower limit.

FIG. 5 illustrates an example of the system during operation when oil reaches a lower limit. When the oil level in the oil collector reaches a lower limit, the valve V1 may close so that oil starts collecting again.

Figure 6:
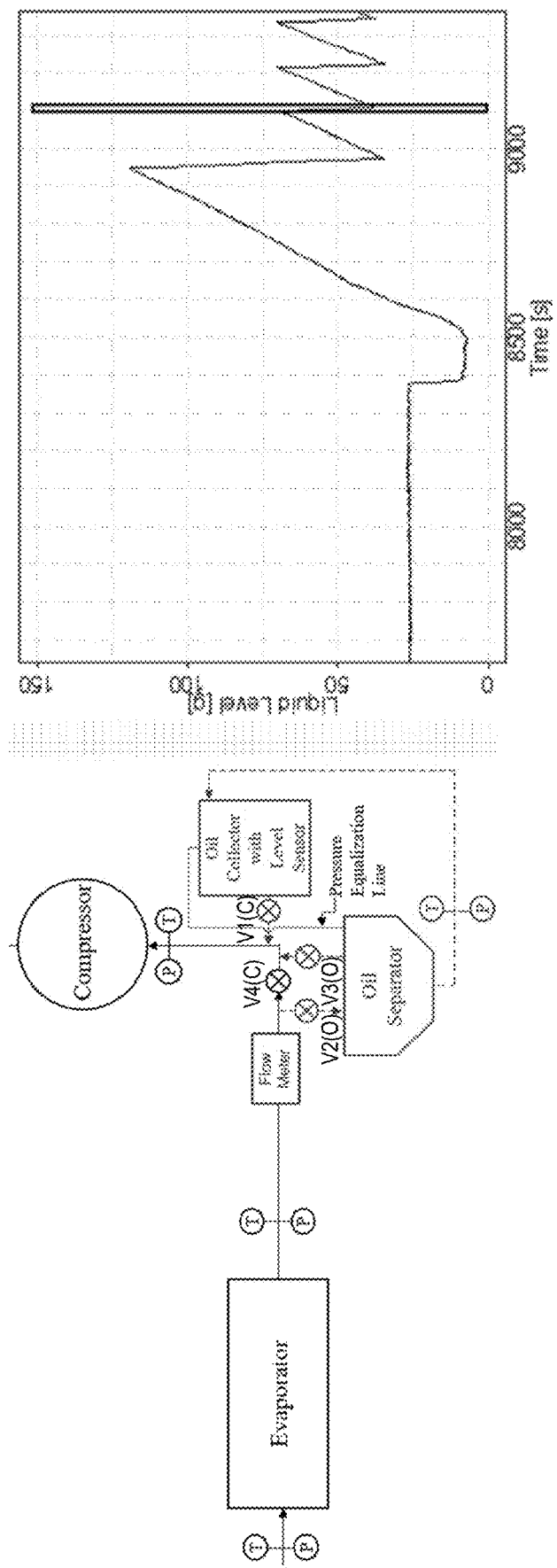
FIG. 6 illustrates an example of the system during operation when an oil measurement loop is repeatedly engaged.

FIG. 6 illustrates an example of the system during operation when the oil measurement loop is repeatedly engaged. V1 may be opened include repeatedly, and at each time the oil measurement loop may be kept engaged. To accurately capture the OCR, it can be important to maintain a steady flow of oil in the system. Therefore, to ensure that the system does not impact the dynamics of the oil circulation, a small amount of oil (e.g. 100 g) may be collected in each cycle. To avoid large slugs of oil returning back to the compressor, oil may be drained slowly by adjusting a manual needle valve installed before the valve V1 in the collector drain line.

Figure 7:
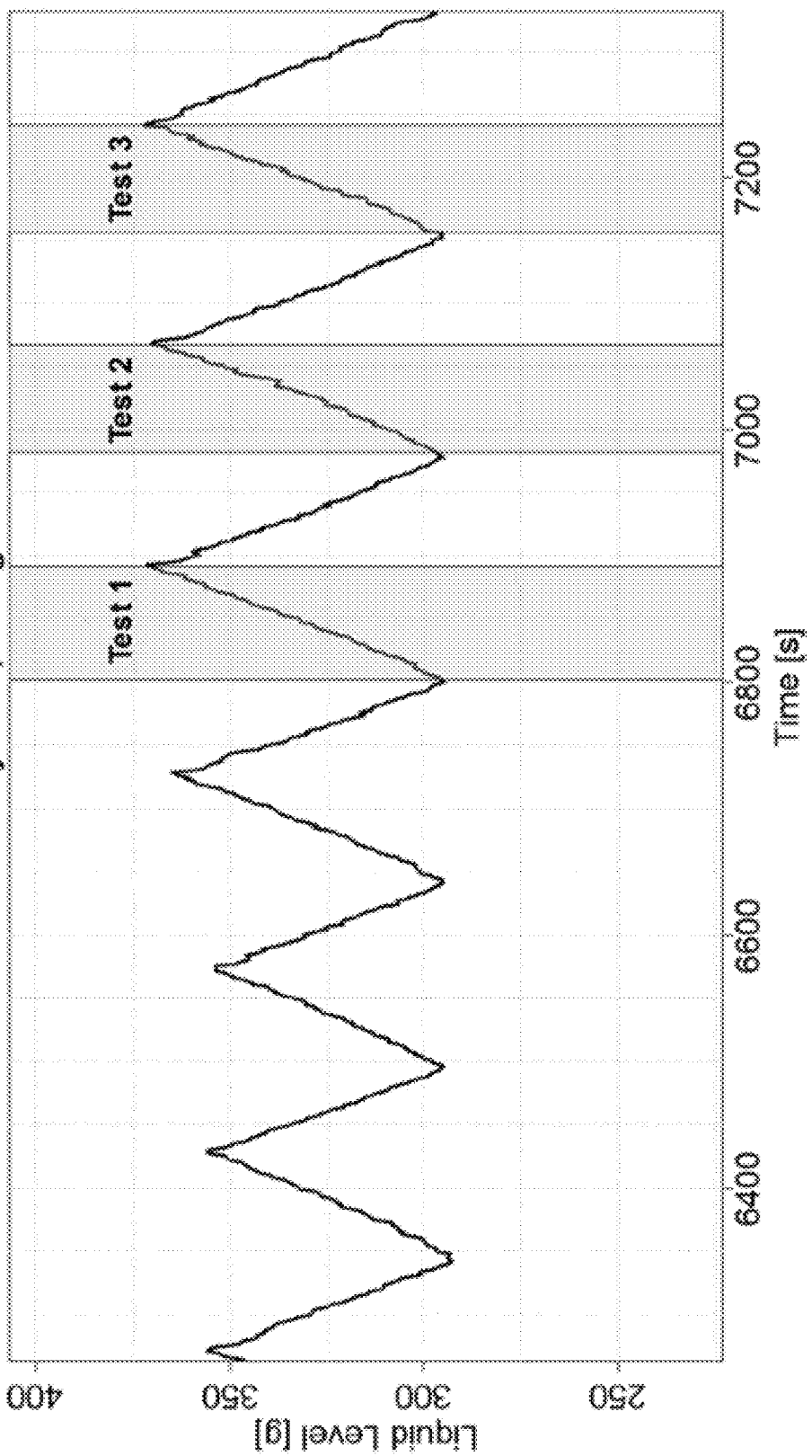
FIG. 7 illustrates an example of test data where a time-series when an oil measurement loop was engaged in the suction line.
Figure 8:
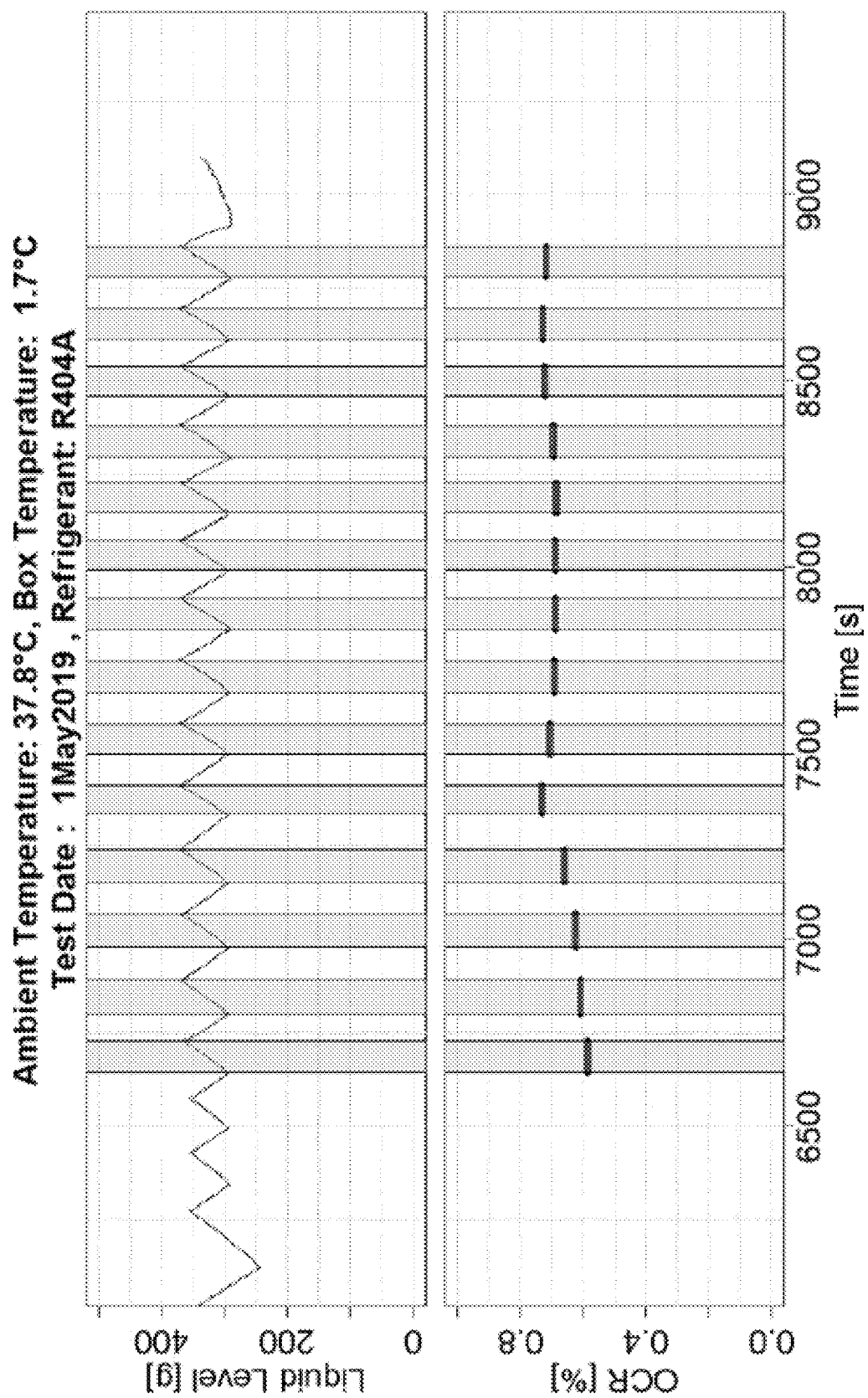
FIG. 8 shows the raw data and a plot showing the calculated OCR values for samples taken during experimentation.

FIG. 7 illustrates an example of test data where a time-series plot of raw data of oil accumulation and discharge in the oil collector when the oil measurement loop was engaged in the suction line. Periods where the measured oil flow rates were relatively constant were selected for analysis and are highlighted in the transparent gray regions of the plots. During these periods, the slope of the oil accumulation over time shown was nearly linear. The amount of oil collected during each period was calculated by taking a difference of the amount of oil in the collector at the beginning and the end of each period. This amount of oil was corrected for the amount of liquid refrigerant that was dissolved in the oil using the solubility of refrigerant/oil pair. This amount of oil was then divided by the number of seconds of the selected period to get mass flow rate of oil. (See Equation 1). The Oil Circulation Ratio (OCR) was calculated by dividing the mass flow rate of oil with the average refrigerant mass flow rate that is measured in the liquid line during each period (See Equation 2). Similarly, OCR was calculated for all the periods at the same condition. Data of three of the periods is tabulated in Table 3 along with the measured refrigerant mass flow rates. The top plot of FIG. 8 shows the raw data of the samples and the bottom plot shows the calculated OCR values for the samples. A major advantage of using this technique of measuring OCR is that multiple samples can be automatically measured, which then helps to capture real-time dynamics of OCR in the system, except for the short discontinuity when the oil is being drained.

$$\dot{m}_{oil} = \frac{(m_{oil,end} - m_{oil,start})(1 - w_{ref})}{t_{end} - t_{start}} \quad \text{(Equation 1)}$$

$$OCR = \frac{\dot{m}_{oil}}{\dot{m}_{ref}} \quad \text{(Equation 2)}$$

TABLE 1

Test data of oil measurements for suction line for example operating conditions

| Sr. | Description | Test 1 | Test 2 | Test 3 | Units |
|---|---|---|---|---|---|
| 1. | Oil mass collected | 70.60 | 68.59 | 72.51 | g |
| 2. | Duration of oil collection | 97 | 92 | 92 | s |
| 3. | Oil mass flow rate | 2.61 | 2.68 | 2.84 | kg/h |
| 4. | Refrigerant + Oil mass flow rate | 457.3 | 456.3 | 456.3 | kg/h |
| 5. | Solubility of R404A in POE32 at operating condition #1 Cavestri, (1995) | 6% | 6% | 6% | % Refrigerant by weight |
| 6.. | OCR | 0.573 | 0.588 | 0.622 | % |

The system may be implemented with additional, different, or fewer components than illustrated.

Figure 9:
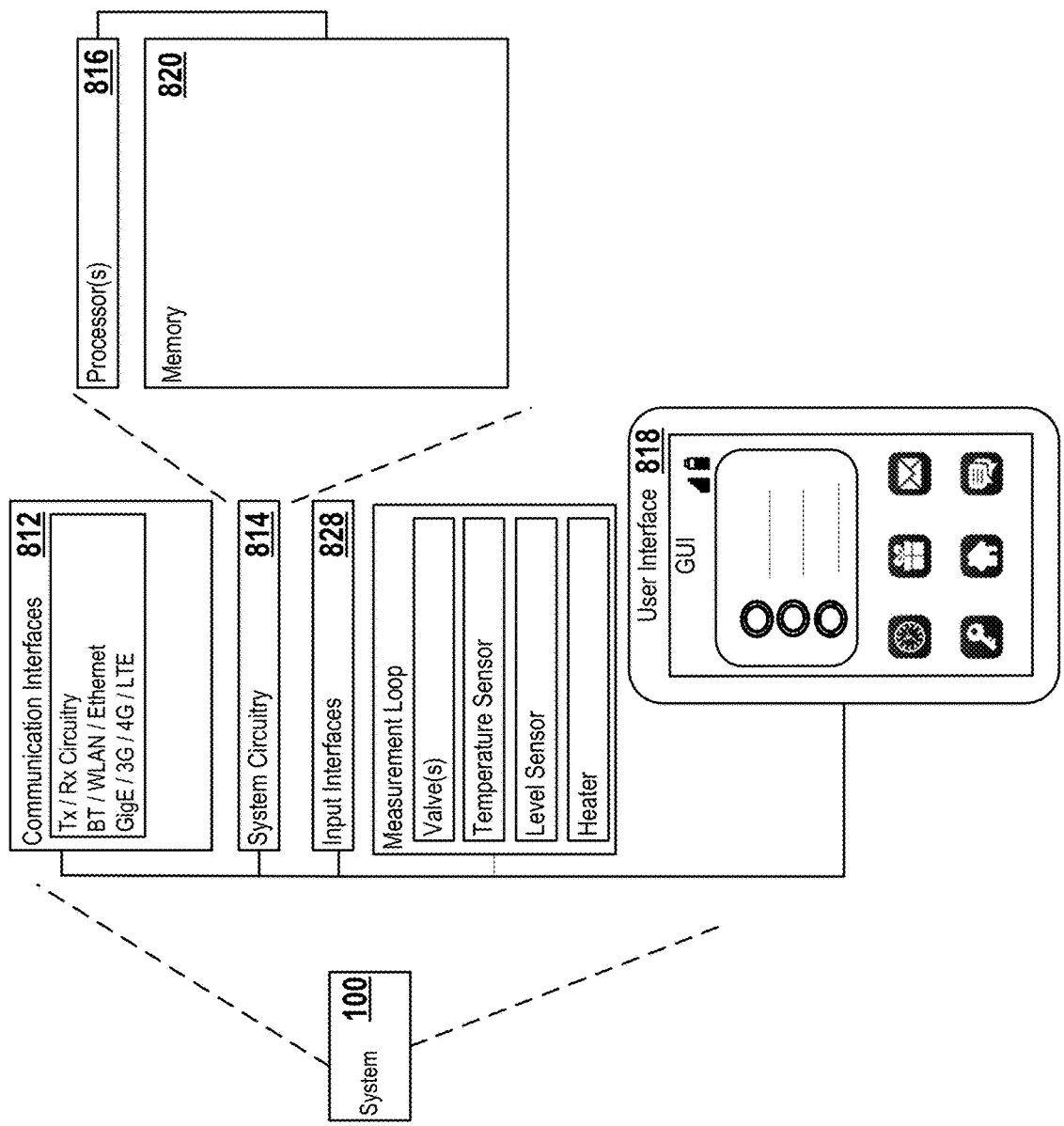
FIG. 9 illustrates a second example of a system.

FIG. 9 illustrates a second example of the system 100. The system 100 may include communication interfaces 812, input interfaces 828 and/or system circuitry 814. The system circuitry 814 may include a processor 816 or multiple processors. Alternatively, or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the system 100. The computer code may include instructions executable with the processor 816.

The processor 816 may communicate with valve(s) to control flows in the oil-measurement loop as described in reference to FIGS. 1-6 above. The processor may receive measurement information from the flow meter, heater, temperature sensor, or interface circuitry connected to one or more of these components. Alternatively, or in addition, the processor may control the heat generated by the heater.

The memory 820 may be any device for storing and retrieving data or any combination thereof. The memory 820 may include non-volatile and/or volatile memory, such as a random-access memory (RAM), a read-only memory (ROM), an erasable programmable read-only memory (EPROM), or flash memory. Alternatively, or in addition, the memory 820 may include an optical, magnetic (hard drive), solid-state drive or any other form of data storage device. Alternatively, or in addition, the memory may include any other component or sub-component of the system 100 described herein. The memory may include instructions executable by the processor 816 to execute operations of the system. In some examples, the memory 820 may store the oil circulation ratio, oil flow rate measurements, oil mass measurements, refrigerant/oil solubility data, any or any other value measured or calculated according to the system and methods described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814. By way of example, the user interface may display the oil circulation ratio, oil flow rate measurements, oil mass measurements, any or any other value measured or calculated according to the system and methods described herein. Alternatively or in addition, the system may communicate the these values over a network via the communication interface (with or without the user interface 818)

The system 100 may be implemented in many ways. In some examples, the system 100 may be implemented with one or more logical components. For example, the logical components of the system 100 may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system, the system comprising:
an oil separator configured to receive the refrigerant and oil flow from a low-pressure line of a vapor-compression refrigeration system (VCRS) and output an oil flow and a refrigerant flow;
an oil collector configured to receive the separated oil flow provided by the oil separator;
a valve configured to control an oil flow from the oil collector to the low-pressure line;
a second valve configured to control the oil and refrigerant flow from the low-pressure line to the oil separator;
a third valve configured to control the separated refrigerant flow from the oil separator to the low-pressure line;
open the second valve and the third valve in response to the VCRS being operational for a predetermined amount of time;
a level sensor configured to measure oil level in the oil collector; and
a processor, the processor configured to:
open the second valve and the third valve in response to the VCRS being operational for a predetermined amount of time;
close, in response to the oil being at or less than a first level, the valve to collect oil in the oil collector; and
open, in response to the oil being at or greater than a second level, the valve to release oil from the oil collector to the low-pressure line.

2. The system of claim 1, wherein the processor is further configured to: measure an amount of oil in an accumulator at the first level of the oil collector;
    measure an amount of oil in the accumulator at the second level of the oil collector;
    generate an oil cycle ratio for the VCRS measurement and the second oil level measurement; and
    output the oil cycle ratio.

3. The system of claim 2, wherein to output the oil cycle ratio, the processor is further configured to:
    store the oil cycle ratio in a memory, communicate the oil cycle ratio over a network, display the oil cycle ratio, or a combination thereof.

4. The system of claim 1, further comprising:
    a mass flow meter configured to measure a flow rate of a refrigerant and oil flow in a liquid line of the vapor-compression refrigeration system (VCRS), wherein the oil cycle ratio is generated based on the first oil level measurement, the second oil level measurement, and the measured flow rate.

5. The system of claim 1 further comprising a pressure equalization line connected to the oil collector and oil separator.

6. The system of claim 1, wherein the oil separator is configured to receive the oil and refrigerant flow upstream of a compressor of the VCRS.

7. The system of claim 6, wherein the oil separator is configured to receive the oil and refrigerant flow downstream from an evaporator of the VCRS.

8. The system of claim 1, wherein the oil collector comprises
    a heater configured to heat the oil collector, and a temperature sensor, wherein the processor is configured to:
    turn on the heater in response to the temperature sensor providing a temperature measurement less than a saturation threshold, the saturation threshold representative of a saturation temperature of the low-pressure line; and
    turn off the heater in response to the temperature sensor providing a temperature measurement greater than the saturation threshold.

9. A method, the method comprising:
    receiving, from an oil level sensor in an oil collector, a signal indicative of oil in the oil collector being at a first level;
    closing, in response to the oil being at the first oil level, a valve to prevent oil from flowing from the oil collector to a low-pressure line of a vapor-compression refrigeration system (VCRS);
    separating, with an oil separator in fluid communication with the oil collector and the low pressure line, an oil flow from an oil and refrigerant flow received from the low-pressure line;
    providing the separated oil flow to the oil collector;
    receiving, from the oil level sensor, a signal indicative of oil in the oil collector being at a second level
    opening, in response to the oil being at a second level, the valve to release oil from the oil collector to the low-pressure line;
    generating an oil cycle ratio for the VCRS based on the amount of oil measured between the level and the second level; and
    outputting the oil cycle ratio.

10. The method of claim 9, wherein outputting the oil cycle ratio further comprises:
    storing the oil cycle ratio in a memory, communicate the oil cycle ratio over a network, display the oil cycle ratio, or a combination thereof.

11. The method of claim 9, further comprising:
    in response to the VCRS being operational for a predetermined amount of time,
    opening a second valve configured to control the oil and refrigerant flow from the low-pressure line to the oil separator, and
    opening a third valve configured to control a separated refrigerant flow from the oil separator to the low-pressure line.

12. The method of claim 9, further comprising:
    receiving temperature data from a temperature sensor attached to the oil collector;
    turn on a heater attached to the oil collector in response to the temperature sensor providing a temperature measurement less than a saturation threshold, the saturation threshold representative of a saturation temperature of the low-pressure line; and
    turn off the heater in response to the temperature sensor providing a temperature measurement greater than the saturation threshold.

13. A vapor-compression refrigeration system, comprising: a processor;
    a low-pressure vapor line that fluidly couples an evaporator and a compressor;
    a high-pressure liquid line fluidly connecting a condenser to the evaporator;
    a mass flow meter configured to measure a flow rate of a refrigerant and oil flow in the liquid line;
    an oil measurement loop fluidly coupled to the low-pressure vapor line, the oil measurement loop, comprising:
        an oil separator in fluid communication with the low-pressure line, the oil separator configured to receive the refrigerant and oil flow from the low-pressure line output an oil flow and a refrigerant flow;
        an oil collector configured to receive the separated oil flow from the oil separator;
        a valve configured to control an oil flow from the oil collector to the low-pressure line; and
        a level sensor configured to measure oil level in the oil collector, wherein the processor is configured to:
        close, in response to the oil being at or less than a first level, the valve to collect oil in the oil collector; and
        open, in response to the oil being at or greater than a second level, the valve to release oil from the oil collector to the low-pressure line;
        derive an oil cycle ratio based on the flow rate from the mass flow meter, a first oil level measured from the level sensor, and a second oil level measurement measured from the level sensor.

14. The vapor-compression refrigeration system of claim 13, wherein the processor is further configured to:
    output the oil cycle ratio.

15. The vapor-compression refrigeration system of claim 14, wherein to output the oil cycle ratio, the processor is further configured to:
    store the oil cycle ratio in a memory, communicate the oil cycle ratio over a network, display the oil cycle ratio, or a combination thereof.

16. The vapor-compression refrigeration system of claim 1, further comprising a second valve configured to control the oil and refrigerant flow from the low-pressure line to the oil separator, a third valve configured to control the separated refrigerant flow from the oil separator to the low-pressure line, wherein the processor is further configured to:
open the second valve and the third valve in response to the vapor-compression refrigeration system being operational for a predetermined amount of time.

17. The vapor-compression refrigeration system of claim 1 further comprising a pressure equalization line connected to the oil collector and oil separator.

* * * * *